No. 695,461. Patented Mar. 18, 1902.
L. JOHNSEN.
AX HANDLE CLAMP.
(Application filed Oct. 3, 1901.)
(No Model.)
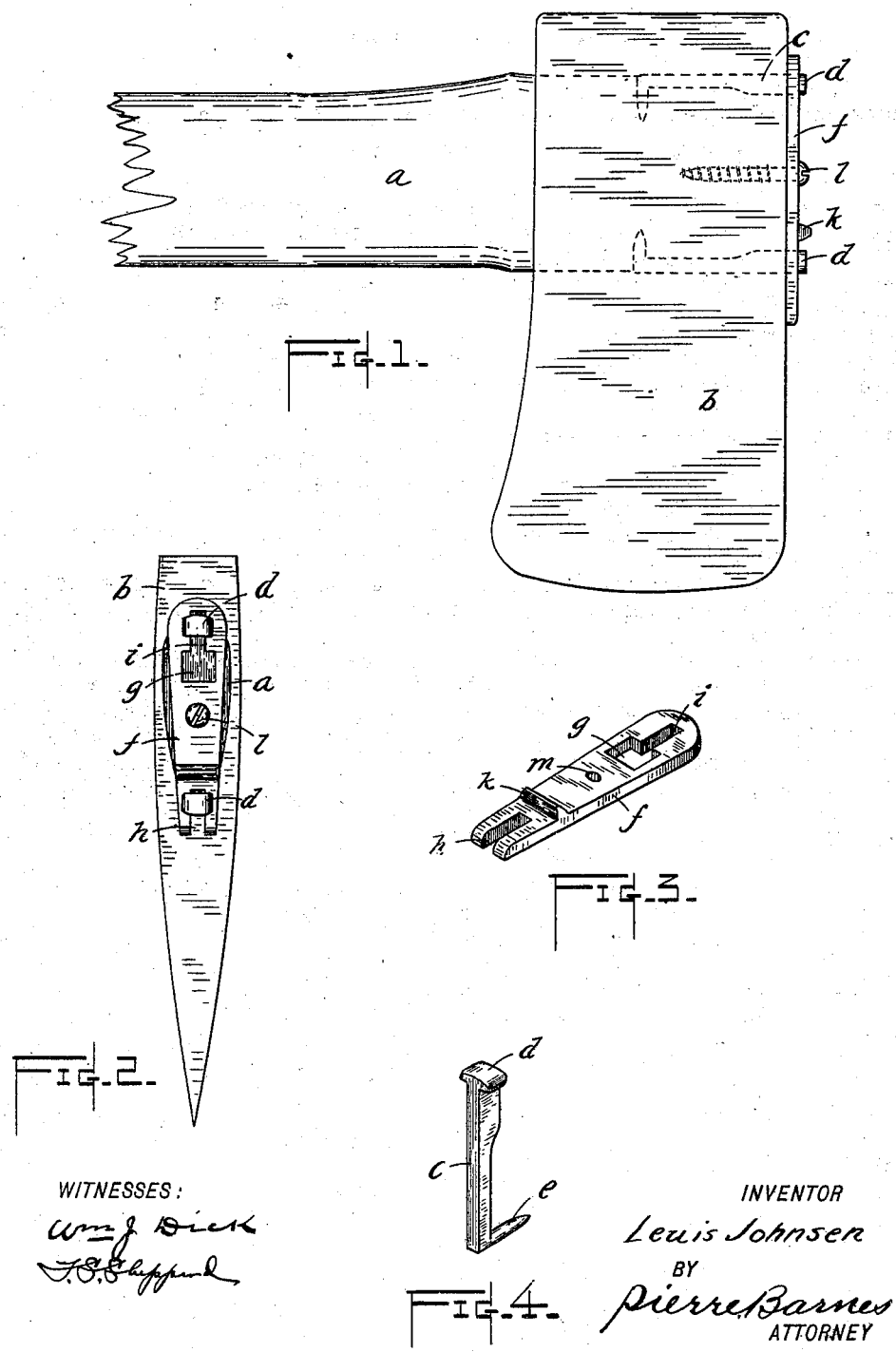
WITNESSES:
INVENTOR
Lewis Johnsen
BY
Pierre Barnes
ATTORNEY

UNITED STATES PATENT OFFICE.

LEUIS JOHNSEN, OF SEATTLE, WASHINGTON.

AX-HANDLE CLAMP.

SPECIFICATION forming part of Letters Patent No. 695,461, dated March 18, 1902.

Application filed October 3, 1901. Serial No. 77,353. (No model.)

*To all whom it may concern:*

Be it known that I, LEUIS JOHNSEN, a citizen of the United States, residing at Seattle, in the county of King and State of Washington, have invented certain new and useful Improvements in Ax-Handle Clamps, of which the following is a specification, reference being had therein to the accompanying drawings.

My invention is an improvement in means for clamping an ax-head to its handle.

It consists of a plate of malleable iron or other metal which engages with clips secured to the ax-handle in such a manner as to positively lock them together.

In the drawings, Figure 1 is a front elevation of an ax with my head-locking device secured thereto, and Fig. 2 is an end view of the same. Figs. 3 and 4 are perspective views of parts of my device.

Similar letters indicate corresponding parts in all of the views.

Referring to the drawings, $a$ is the handle, which is fitted to the socket of the head $b$ so that the end thereof will be flush or even with the surface of the head.

$c$ represents clips having heads $d$ at one end and bent so as to provide penetrating-points $e$ for inserting into the front and back edges of the handle at a distance from its end sufficient to permit their heads projecting beyond the ax-head when the handle is in place for the insertion of a locking-plate $f$ between the clip-heads and the head of the ax. The said locking-plate, which is of greater length than the length of the socket of the ax-head, is provided with an aperture $g$ of size and form to receive the head of a clip and two slots longitudinal of its length, one of which, $h$, extending from the end of the plate and the other, $i$, extending in the same direction from the aperture, the said aperture being positioned at a distance from the slotted end of the plate less than the distance between the clips when in place. A projection $k$ may be formed upon the locking-plate to furnish a thumb-bearing when the plate is being slid along to clamp the handle, and to prevent the plate from being dislocated by the jarring of the ax while chopping a screw $l$ is inserted into the handle through a hole $m$, provided in the plate.

The handle is removed from the ax-head by withdrawing the screw. A light tap upon the end of the locking-plate moves the latter to relieve the clip-heads and allow the handle being readily withdrawn.

Having thus described my invention, what I claim as new, and desire to secure by Letters Patent, is—

1. An ax-head-clamping device, comprising two hook-shaped members provided with heads adapted to engage over slots in a plate, said plate having an aperture adapted to receive the head of one of the said members and said slots extending, respectively, in the same direction from the said aperture and an end of the plate, and a set-screw, substantially as described.

2. In combination with two headed clips adapted to engage with an ax-handle, of a locking-plate provided with an aperture and two longitudinal slots adapted to receive the shanks of said clips, one of said slots $h$ extending from an end of the plate and the other $i$ terminating in the said aperture $g$, said slot and said aperture, substantially as and for the purposes set forth.

In testimony whereof I affix my signature in presence of two witnesses.

LEUIS JOHNSEN.

Witnesses:
 SIERRE BARNES,
 WM. J. DICK.